United States Patent [19]
Mori et al.

[11] Patent Number: 5,574,254
[45] Date of Patent: Nov. 12, 1996

[54] WATER-PROOF SEALING STRUCTURE FOR AN ELECTRIC JUNCTION BOX

[75] Inventors: Fumimasa Mori; Masato Odake, both of Tokyo; Kazuhiro Shimizu; Fumio Kumagai, both of Kosai, all of Japan

[73] Assignees: Yazaki Corporation; Arai Seisakusho Co., Ltd., both of Tokyo, Japan

[21] Appl. No.: 443,192

[22] Filed: May 17, 1995

[30] Foreign Application Priority Data

May 25, 1994 [JP] Japan ..................... 6-110795

[51] Int. Cl.$^6$ .................................................. H02G 3/14
[52] U.S. Cl. .................. 174/52.3; 220/DIG. 14; 361/641
[58] Field of Search ........................ 174/52.1, 52.2, 174/52.3; 220/361, DIG. 14; 361/600, 601, 602, 622, 625, 627, 641

[56] References Cited

U.S. PATENT DOCUMENTS

| | | | |
|---|---|---|---|
| 4,335,273 | 6/1982 | Levin | 174/52.3 |
| 4,780,578 | 10/1988 | Heskel | 174/52.3 X |
| 4,893,215 | 1/1990 | Urushiwara et al. | 174/52.3 X |
| 5,135,108 | 8/1992 | Nestlen et al. | 206/328 |
| 5,264,661 | 11/1993 | Luettgen | 439/569 X |

FOREIGN PATENT DOCUMENTS 1-58983  4/1989  Japan .

*Primary Examiner*—Peter S. Wong
*Assistant Examiner*—Paramita Ghosh
*Attorney, Agent, or Firm*—Nikaido, Marmelstein, Murray & Oram LLP

[57] ABSTRACT

A water-proof sealing structure for an electric junction box including a main box having a first fitting portion and a water-proof covering having a second fitting portion to be mated with the first fitting portion; wherein either the first or second fitting portion is integrally formed with an elastomer-made fitting groove having a narrowed portion therein, while the other fitting portion is formed with a locking projection wall provided with a stopper; wherein the locking projection wall is suppressed by the narrowed portion when inserted into the fitting groove, forming simultaneously an air-keeping section between a top end of the locking projection wall and an innermost portion of the fitting groove. With the construction above, a large force is not required for the fitting operation, an easy fitting between the water-proof covering and the main box is made possible, the locking member is substantially simplified, and also a sufficiently strong adhesive force is provided by the locking member which is made by monolithically molding a synthetic resin but not a metal.

4 Claims, 3 Drawing Sheets

WATER-PROOF SEALING STRUCTURE FOR AN ELECTRIC JUNCTION BOX

BACKGROUND OF THE INVENTION

1. Field of the Invention

The present invention relates to a water-proof sealing structure for an electric junction box which is adopted for wiring distribution in a vehicle or the like.

2. Description of the Prior Art

Water-proof sealing structures for an electric junction box have conventionally been constructed as shown in FIGS. 4 to 6, as were proposed in Japanese Utility Model Laid-Open No.1-58983, wherein a packing d or e made of elastomer and rubber respectively (FIG. 6) is attached to a fitting portion c of a water-proof covering which is to be fitted into a main box a, whereas a fitting projection f of the main box a is pushed into the above packing d or e so as to provide a water-proof sealing function due to the suppressing force thereof.

However, as it is required to give a substantially large suppressing force with respect to the fitting projection f and packing d (or e) for securing the water-proofing effect thereof, a locking member composed of a hook portion g and a locking hollow h has to be provided as shown in FIG. 7, which, however, increases the total weight, and cost thereof can be increased. Further, in case a step portion is formed on the fitting portion c of the water-proof covering b because of the condition that the space within the vehicle for mounting the electric junction box is not wide enough to make the fitting portion c in a flat shape, the fitting operation at the step portion can be imperfectly done or the adhesion of the packing is loosened, so that a leakage of water or the like can be thereby caused.

SUMMARY OF THE INVENTION

The present invention has been made to eliminate the above-mentioned problems, and accordingly, it is an object of the present invention to provide a water-proof sealing structure for an electric junction box, wherein water-proofing function is secured, the structure of fitting portions can be freely modified, a required force for fitting the water-proof covering to the main box is substantially minimized, yet the total weight and size thereof are also minimized and reliable.

In order to accomplish the above objective, the water-proof sealing structure according to the present invention is constructed such that a fitting portion in either one of a main box or a water-proof covering, namely a female fitting portion, is formed with a fitting groove having a narrowed portion made of elastomer therein, whereas a fitting portion of the other, namely a male fitting portion, is formed with a locking projection wall having a stopper, wherein the locking projection wall inserted into the fitting groove of the female fitting portion is suppressed by the narrowed portion, and an air-keeping section is formed between the top end of the locking projection wall and the ceiling portion of the fitting groove.

In the construction above, it will be preferred if the narrowed portion of the fitting groove is formed such that two projections are consecutively formed around the entire groove each protruding from each side of the inner wall of the fitting groove in a vertically parallel relation with some distance away from each other.

According to the present invention, when inserting a locking projection wall having a stopper formed on the male fitting portion into a fitting groove which is made of elastomer and disposed at the female fitting portion, a narrowed portion formed in the fitting groove suppresses the locking projection wall, and simultaneously air is pressurized and maintained in an air-keeping section thereof, whereby the water-proofing function thereof is secured to completely avoid leakage of water from outside.

Since the water-proof sealing structure of the present invention is not the type for suppressing a packing with a locking projection wall, a large force is not required for the fitting operation, an easy fitting between the water-proof covering and the main box is made possible, the locking member is substantially simplified, and also a sufficiently strong adhesive force is provided by the locking member which is made by monolithically molding a synthetic resin but not a metal.

Further, since the stopper formed on the locking projection wall prevents the locking projection wall from clashing into the innermost part (ceiling) of the fitting groove, even if a rather acute step portion is formed on the female fitting portion, or even if the water-proof covering is not completely fitted into the main box, a substantially water-tight structure can be made possible.

Still further, by forming projections on the respective sides of the inner wall of the fitting groove for making a narrowed portion therein in such a manner that they are positioned in vertically different levels in a parallel relation with some distance away from each other, the insertion of the locking projection wall is made easy so as to smoothly fit the water-proof covering into the main box, and also an arrangement of the fitting groove can be freely modified as the strength of a mold for forming this fitting groove will not be impaired even if the narrowed space is arranged substantially narrow,.

Other features and advantages of the invention will be apparent from the following description taken in connection with the accompanying drawings.

DETAILED DESCRIPTION OF THE PREFERRED EMBODIMENTS

In the following, one embodiment of the present invention is described with reference to the accompanying drawings.

Figure 1:
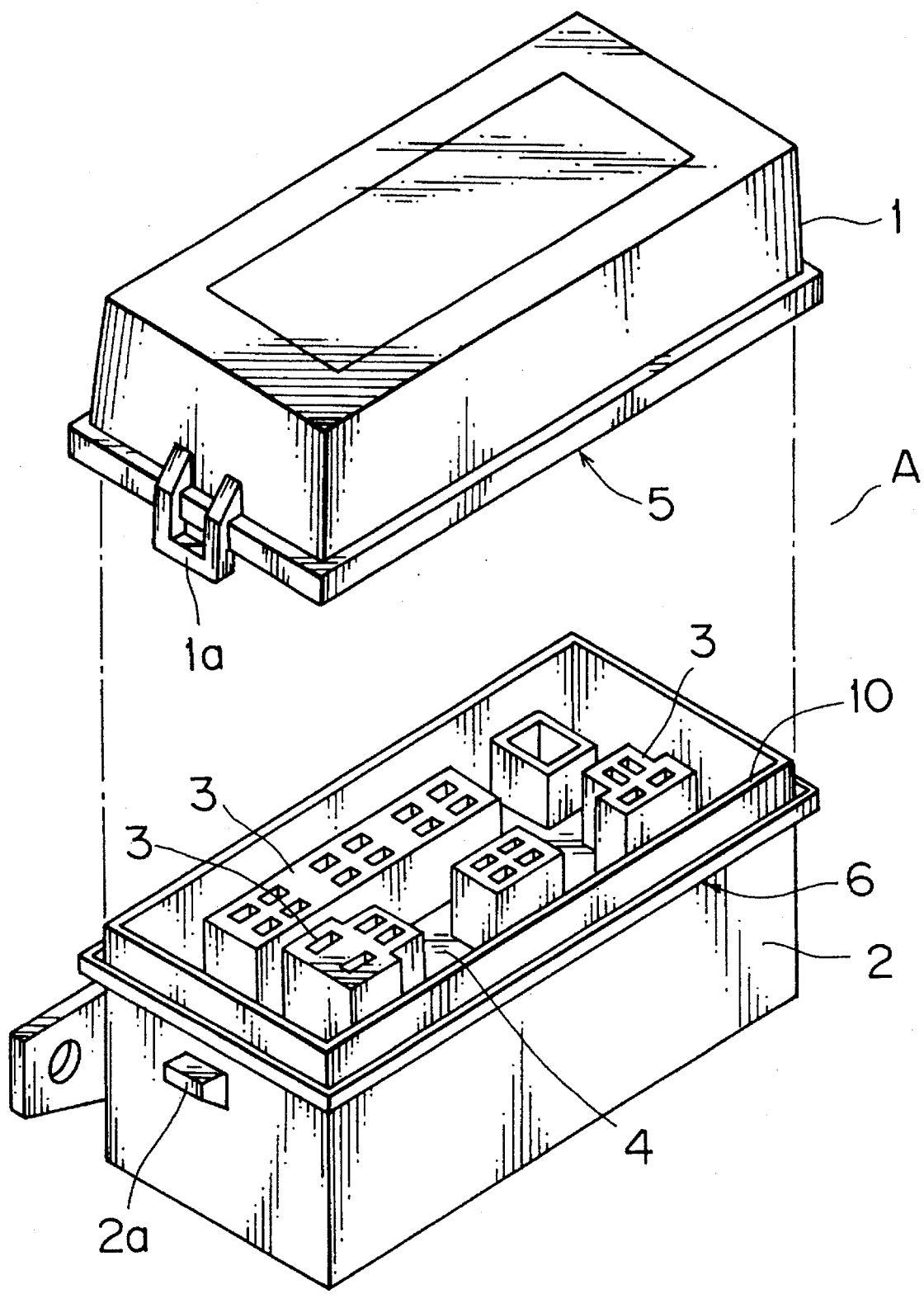
FIG. 1 is a perspective view showing an electric junction box according to one embodiment of the present invention wherein a water-proof covering and a main box are separated from each other.

FIG. 1 is a perspective view showing an electric junction box A according to the present invention wherein a water-proof covering 1 and a main body 2 are separated from each other, and a distribution board having a plurality of connectors 3 thereon is accommodated in the main box 2. With this construction, in order to secure the water-proofing function thereof, the water-proof covering 1 is first placed over the main box 2, then by matching a fitting portion 5 of the water-proof covering 1 with a fitting section 6 of the main box 2, and fitting a locking hook 1a of the water-proof covering 1 to a locking claw 2a protruded from the main box, the water-proof covering 1 and the main box 2 are completely sealed to avoid leakage of water from outside.

Figure 2:
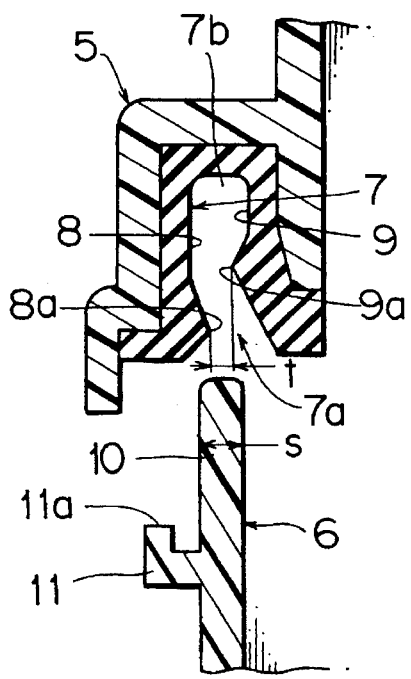
FIG. 2 is a sectional view illustrating a fitting portion of the main box and that of the water-proof covering of FIG. 1.

The fitting portion 5 of the water-proof covering 1 is formed in a double-wall structure around the entire periphery of the opening of the water-proof covering 1, and formed within the entire inner side thereof is, as shown in FIG. 2, a fitting groove 7 made of elastomer.

The water-proof covering 1 is formed by molding a synthetic resin material such as polypropylene, a mixture of polypropylene and talc, and a mixture of polypropylene, glass and talc, to which covering 1 the fitting groove 7 made of elastomer is also integrally formed in a monolithic molding method. The elastomer used here can be of olefin elastomer, stylene elastomer and so on.

In the nearby area of the opening of the fitting groove 7, angle projections 8a and 9a are formed respectively at the opposite side of the inner wall of the fitting groove 7 in a vertically parallel relation having some distance from each other. With the effect of these projections 8a and 9a, the space between the inner wall 8 and 9 is narrowed to form a narrowed portion 7a at the open inlet of the fitting groove 7, and also an air-keeping section 7b is provided at the innermost section of the groove 7 which is surrounded by these inner walls 8 and 9.

The fitting section 6 of the main box 2 is formed with a locking projection wall 10 around the entire opening thereof, and a stopper 11 is protrudedly mounted at the outer end of the locking projection wall 10. The projection wall 10 has a thickness s which is thicker than the space t of the narrowed portion 7a of the fitting groove 7, so that the wall 10 inserted into the groove 7 is suppressed by the narrowed portion 7a.

Figure 3:
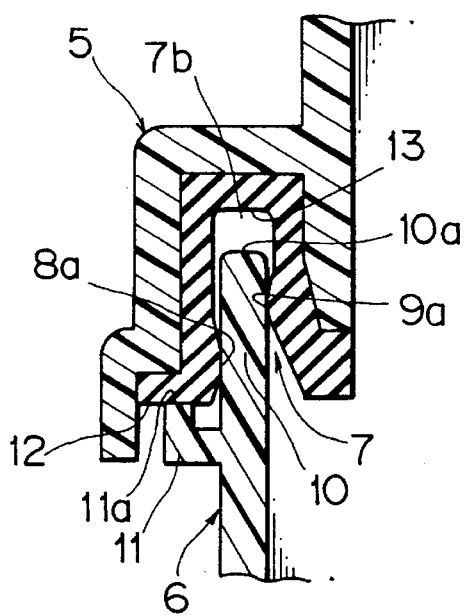
FIG. 3 is a sectional view illustrating a state that both fitting portions are mated and fitted with each other.
Figure 4:
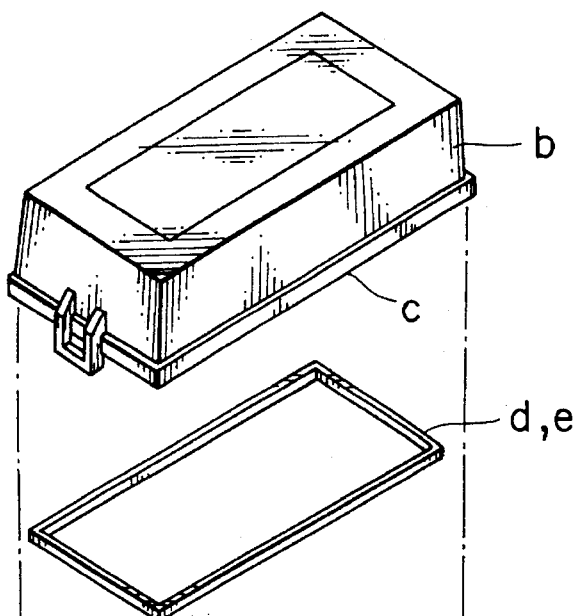
FIG. 4 is a perspective view showing an electric junction box of a prior art.
Figure 5:
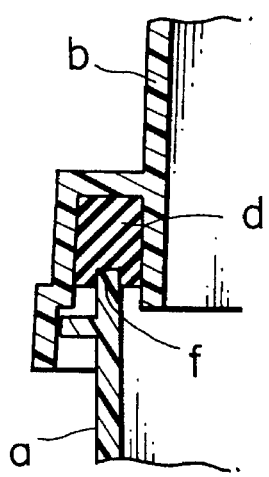
FIG. 5 is a sectional view illustrating a fitting portion of the main box and that of the water-proof covering of FIG. 4.
Figure 6:
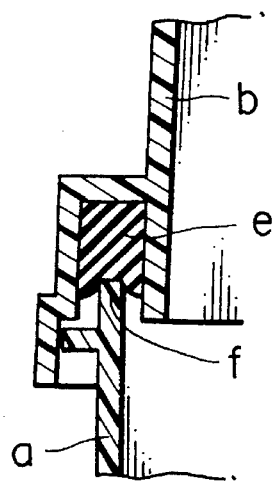
FIG. 6 is a sectional view illustrating a fitting portion of the main box and that of the water-proof covering in another prior art.
Figure 7:
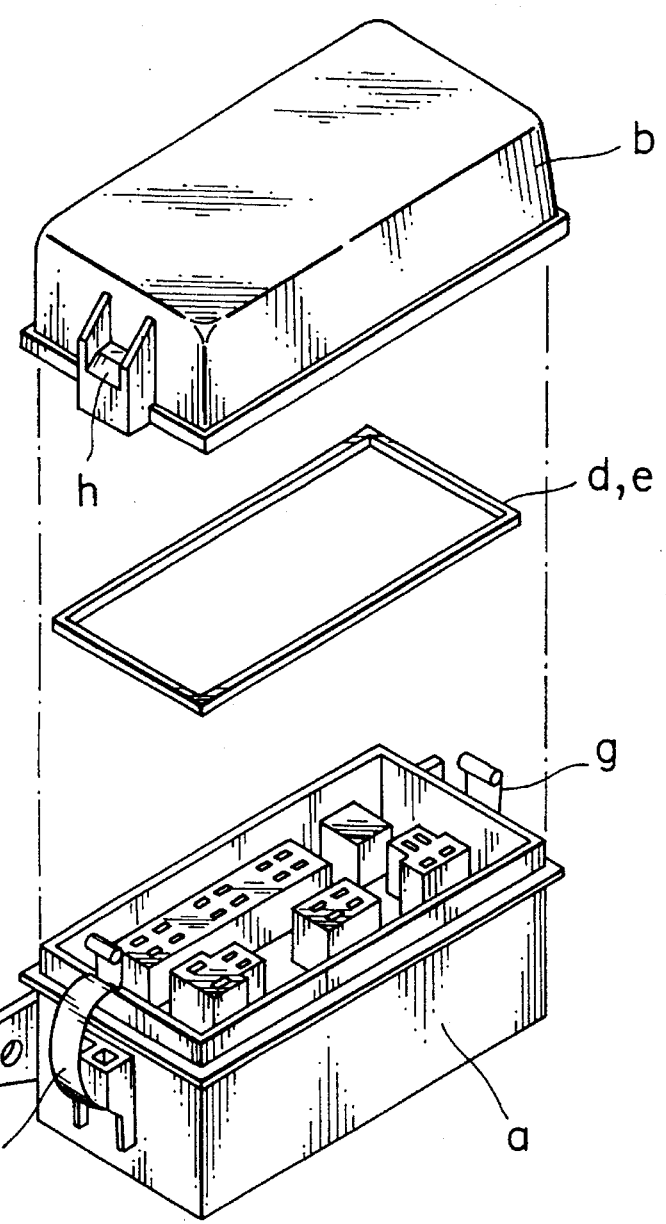
FIG. 7 is an illustration explaining locking members for locking the respective fitting portions of FIG. 6.

FIG. 3 shows a state that the locking projection wall 10 is inserted into the fitting groove 7, wherein the locking projection wall 10 is first pushed into the narrowed portion 7a of the groove 7, and then pushed more profoundly receiving the suppression caused by the projections 8a and 9a, and finally the insertion of the projection wall 10 is stopped at a position where the stopper 11 is abutted against the periphery 12 of the fitting groove 7.

When the stopper 11 is abutted to the periphery 12 of the fitting groove 7, the locking projection wall 10 is stopped before reaching the innermost portion 13 of the groove 7, thereby leaving an air-keeping space 7b to maintain the pressurized air therein.

It is to be noted that since the projections 8a and 9a are formed at vertically different positions with some distance away from each other, the locking projection wall 10 is easily inserted, whereby the fitting operation between the main box 2 and the water-proof covering 1 can be readily completed with a small force. Further, even if the space at the narrowed portion is arranged to be substantially narrow, the strength of a mold for forming the fitting groove will not be impaired thereby and remains the same.

Effect of the Invention

Since the water-proof sealing structure of the present invention is not the type for suppressing a packing by a locking projection wall, a large force is not required for the fitting operation, an easy fitting between the water-proof covering and the main box is made possible, the locking member is substantially simplified, and also a sufficiently strong adhesive force is provided by the locking member which is made of monolithic resin but not a metal, whereby the total weight and size thereof can be minimized. Further, since a packing is no longer needed due to the fact that the fitting groove is monolithically formed on the fitting portion, and also since it is arranged such that the locking projection wall is prevented from clashing into the innermost part of the fitting groove, even if a rather acute step portion is formed on the fitting portion, or even if the water-proof covering is not completely fitted into the main box, a substantially water-tight structure can be made possible, thereby providing an improvement in the reliability thereof.

Still further, by forming projections on the respective sides of the inner wall of the fitting groove for making a narrowed portion therein in such a manner that they are positioned at vertically different levels with some distance away from each other, the insertion of the locking projection wall is made easy so as to smoothly fit the water-proof covering to the main box, and also an arrangement of the fitting groove can be freely modified as the strength of a mold for forming this fitting groove will not be impaired even if the narrowed space is arranged substantially narrow.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is;

1. A water-proof sealing structure for an electric junction box comprising a main box having a first fitting portion and a water-proof covering having a second fitting portion to be mated with said first fitting portion; wherein one of said first fitting portion and said second fitting portion is integrally formed with an elastomer-made fitting groove having a narrowed portion therein, while another of said first fitting portion and said second fitting portion is formed with a locking projection wall provided with a stopper; said locking projection wall being suppressed by said narrowed portion when inserted into said fitting groove, forming simultaneously an air-keeping section between a top end of said locking projection wall and an innermost portion of said fitting groove.

2. A water-proof sealing structure as claimed in claim 1, wherein said stopper is formed at an outer end of said locking projection wall, said stopper being abutted against a periphery of the fitting groove before said locking projection wall reaches the innermost portion of said fitting groove.

3. The water-proof sealing structure as claimed in claim 1, wherein said fitting groove is defined by an inner wall having an inner wall surface and an outer wall surface, and said narrowed portion of said fitting groove is formed by a pair of angle projections, said pair of angle projections being formed in a vertically parallel relation and protruding respectively from said inner wall surface and said outer wall surface of said inner wall.

4. The water-proof sealing structure as claimed in claim 3, wherein each of said pair of angle projections forms a line of intersection which is spaced different distances from the innermost portion of said fitting groove.

* * * * *